United States Patent
Kuefler et al.

(10) Patent No.: US 9,971,444 B2
(45) Date of Patent: May 15, 2018

(54) TOUCH SENSOR WITH ELECTRICALLY ISOLATED TOUCH REGIONS

(71) Applicant: Rockwell Collins, Inc., Cedar Rapids, IA (US)

(72) Inventors: Alan M. Kuefler, Marion, IA (US); Allen C. Hunt, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 85 days.

(21) Appl. No.: 15/151,735

(22) Filed: May 11, 2016

(65) Prior Publication Data

US 2017/0329447 A1    Nov. 16, 2017

(51) Int. Cl.
    *G06F 3/041*    (2006.01)
(52) U.S. Cl.
    CPC .. *G06F 3/0416* (2013.01); *G06F 2203/04104* (2013.01)
(58) Field of Classification Search
    CPC .......... G06F 3/041; G06F 3/045; G06F 3/044; G06F 3/0416
    USPC .................................................. 345/173, 174
    See application file for complete search history.

(56) References Cited

U.S. PATENT DOCUMENTS

| | | | |
|---|---|---|---|
| 2006/0221061 A1* | 10/2006 | Fry ......................... | G06F 3/041 345/173 |
| 2014/0176819 A1* | 6/2014 | Yilmaz ................. | G06F 1/1692 349/12 |
| 2015/0379964 A1* | 12/2015 | Lee .......................... | G09G 5/12 345/173 |
| 2017/0097706 A1* | 4/2017 | Mahdi ..................... | G06F 3/045 |

* cited by examiner

*Primary Examiner* — Calvin C Ma
(74) *Attorney, Agent, or Firm* — Angel N. Gerdzhikov; Donna P. Suchy; Daniel M. Barbieri

(57) ABSTRACT

Touch sensors with multiple electrically isolated touch regions are disclosed. A touch sensor may be electrically partitioned into a first touch region and a second touch region. The first touch region and the second touch region may be physically connected and electrically isolated from each other. The first touch region and the second touch region may each independently define an independently operable portion of the touch sensor such that a failure in one of the first touch region or the second touch region does not impair operations in another one of the first touch region or the second touch region. A touch sensor configured in this manner may be implemented as a standalone touch sensing device, or as a component of other devices such as electronic displays or the like.

10 Claims, 7 Drawing Sheets

TOUCH SENSOR WITH ELECTRICALLY ISOLATED TOUCH REGIONS

BACKGROUND

A touch sensor is an electronic device that is capable of receiving user input through single- or multi-touch gestures by touching the sensor with a stylus and/or one or more fingers.

There are various types of touch sensors available. Some touch sensors, referred to as resistive touch sensors utilize thinly separated electrically-resistive layers to detect touch gestures. Resistive touch sensors are reliable and are resistant to liquids and other contaminants, making them suitable for operating environments such as restaurants, factories, hospitals, and vehicles. However, currently available resistive touch sensors are not configured to provide the level of redundancy required in certain (e.g., avionics) applications.

SUMMARY

In one aspect, embodiments of the inventive concepts disclosed herein are directed to an apparatus. The apparatus may include a touch sensor electrically partitioned into a first touch region and a second touch region. The first touch region and the second touch region may be physically connected and electrically isolated from each other. The first touch region and the second touch region may each independently define an independently operable portion of the touch sensor such that a failure in one of the first touch region or the second touch region does not impair operations in another one of the first touch region or the second touch region.

In a further aspect, embodiments of the inventive concepts disclosed herein are directed to an apparatus. The apparatus may include a touch sensor electrically partitioned into a first touch region and a second touch region. The first touch region and the second touch region may be physically connected and electrically isolated from each other. The first touch region and the second touch region may each independently define an independently operable digital resistive matrix such that a failure in one of the first touch region or the second touch region does not impair operations in another one of the first touch region or the second touch region.

In another aspect, embodiments of the inventive concepts disclosed herein are directed to an apparatus. The apparatus may include a touch sensor electrically partitioned into a first touch region and a second touch region. The first touch region and the second touch region may be physically connected and electrically isolated from each other. The first touch region and the second touch region may each independently define a 5-wire touch region serving as an independently operable portion of the touch sensor such that a failure in one of the first touch region or the second touch region does not impair operations in another one of the first touch region or the second touch region.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
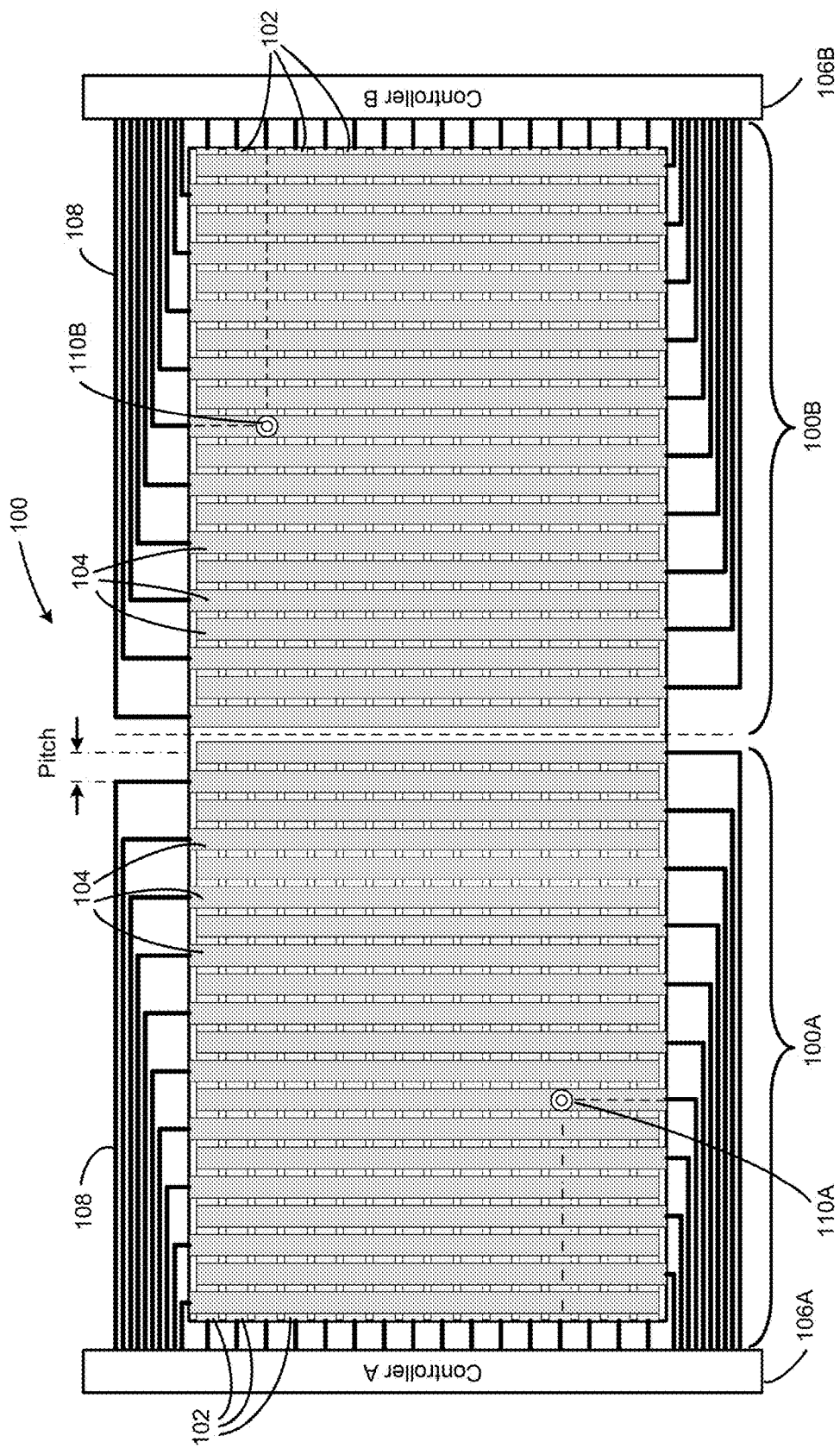
FIG. 1 is a block diagram of an exemplary touch sensor according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to touch sensors with multiple electrically isolated touch regions. Touch sensors configured in this manner may be implemented as standalone touch sensing devices, or as components of devices such as electronic displays or the like. By providing a touch sensor with multiple electrically isolated touch regions, a failure in one region of the touch sensor does not impair operations in other region(s) of the same touch sensor, allowing the touch sensor to be utilized in an operating environment that may require true redundancy.

Referring generally to FIG. 1, a block diagram of an exemplary touch sensor 100 configured in accordance with an embodiment of the inventive concepts disclosed herein is shown. The touch sensor 100 may include two physically connected and electrically isolated touch regions 100A and 100B formed on the same substrate. Each touch region 100A/100B may operate independently/autonomously. If the touch region 100A fails, for example, the touch region 100B may still remain operational.

To achieve this electrical isolation, each touch region 100A/100B of the touch sensor 100 may independently define its own portion of a digital resistive matrix utilizing a plurality of conductive sensor tracks 102 positioned in a first (e.g., a horizontal) direction and a plurality of conductive sensor tracks 104 positioned in a second (e.g., a vertical) direction. Each sensor track 102/104 may be electrically connected to a corresponding controller 106A or 106B (which may be implemented as dedicated processing units, application-specific integrated circuits (ASICs), field-programmable gate arrays (FPGAs) or various other types of processors or processing units) via a track interconnect 108 as shown in FIG. 1.

The track interconnects 108 are provided to facilitate detection of touch inputs. In some embodiments, one track interconnect 108 is used for a given sensor track 102/104. Upon receiving a touch input 110A in the touch region 100A, for example, the force associated with the touch input 110A may compress the horizontal and vertical tracks located at the touch input 110A location, forming an electrical connection (as indicated in FIG. 1) that enables the controller 106A to determine the location of the touch input 110A. Similarly, upon receiving a touch input 110B in the touch region 100B, the force associated with the touch input 110B may compress the horizontal and vertical tracks located at the touch input 110B location, forming another electrical connection that enables the controller 106B to determine the location of the touch input 110B. By scanning the digital resistive matrix defined in each touch region 100A/100B independently, locations of touch inputs received across the entire touch sensor 100 can be accurately determined.

Figure 2:
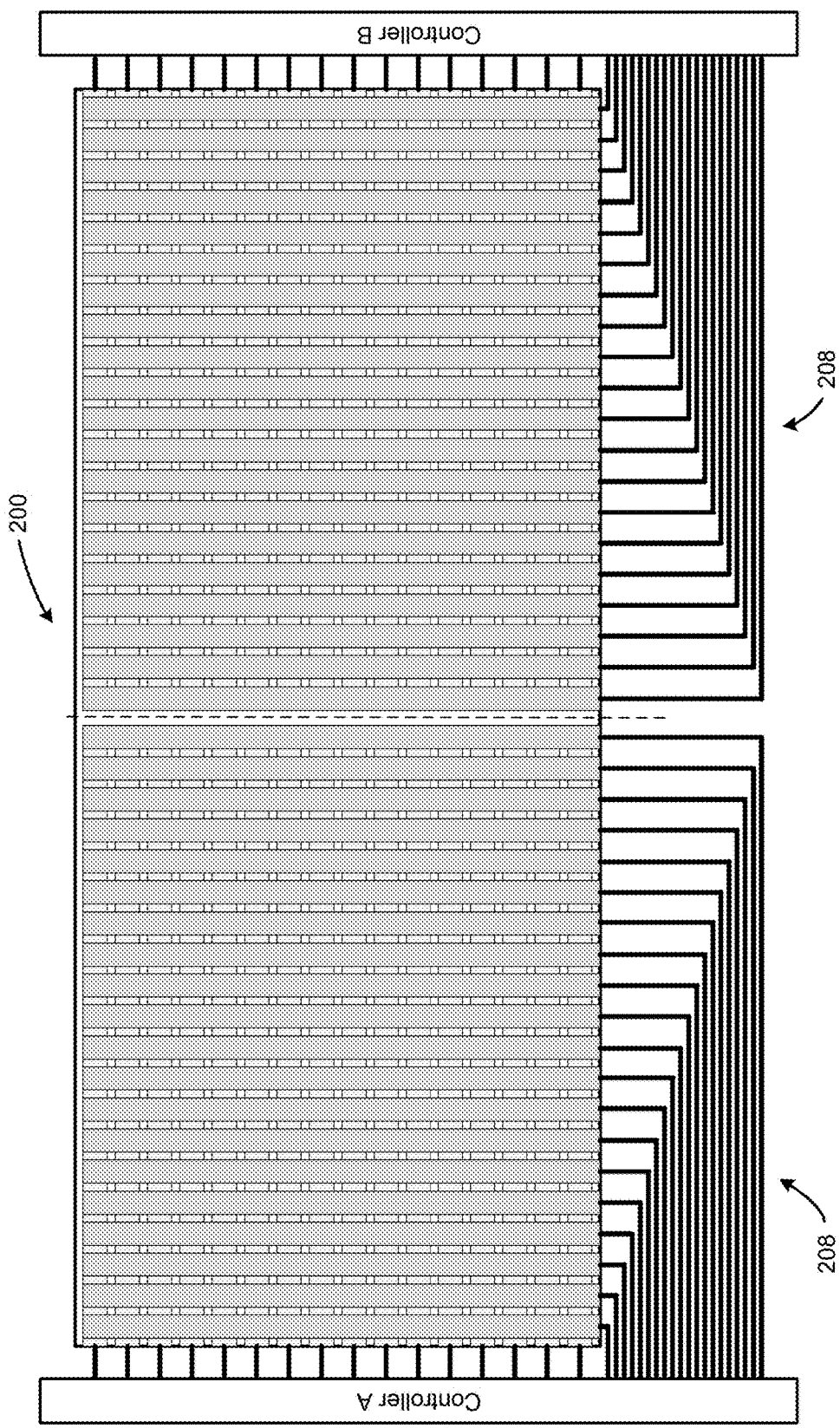
FIG. 2 is a block diagram of another exemplary touch sensor according to an exemplary embodiment of the inventive concepts disclosed herein.

Referring now to FIG. 2, a block diagram of another exemplary touch sensor 200 configured in accordance with an embodiment of the inventive concepts disclosed herein is shown. It is noted that the touch sensor 200 is similar to the touch sensor 100 previously described, except for the positioning of some track interconnects 208. More specifically, instead of positioning the track interconnects 108 symmetrically as shown in FIG. 1, the track interconnects 208 may be positioned asymmetrically as shown in FIG. 2 to make one side (e.g., the top side) of the touch sensor 200 free of track interconnects 208. It is contemplated that the track interconnects 208 may be positioned in the manner as depicted in FIG. 2, or in various other manners without departing from the broad scope of the inventive concepts disclosed herein.

Figure 3:
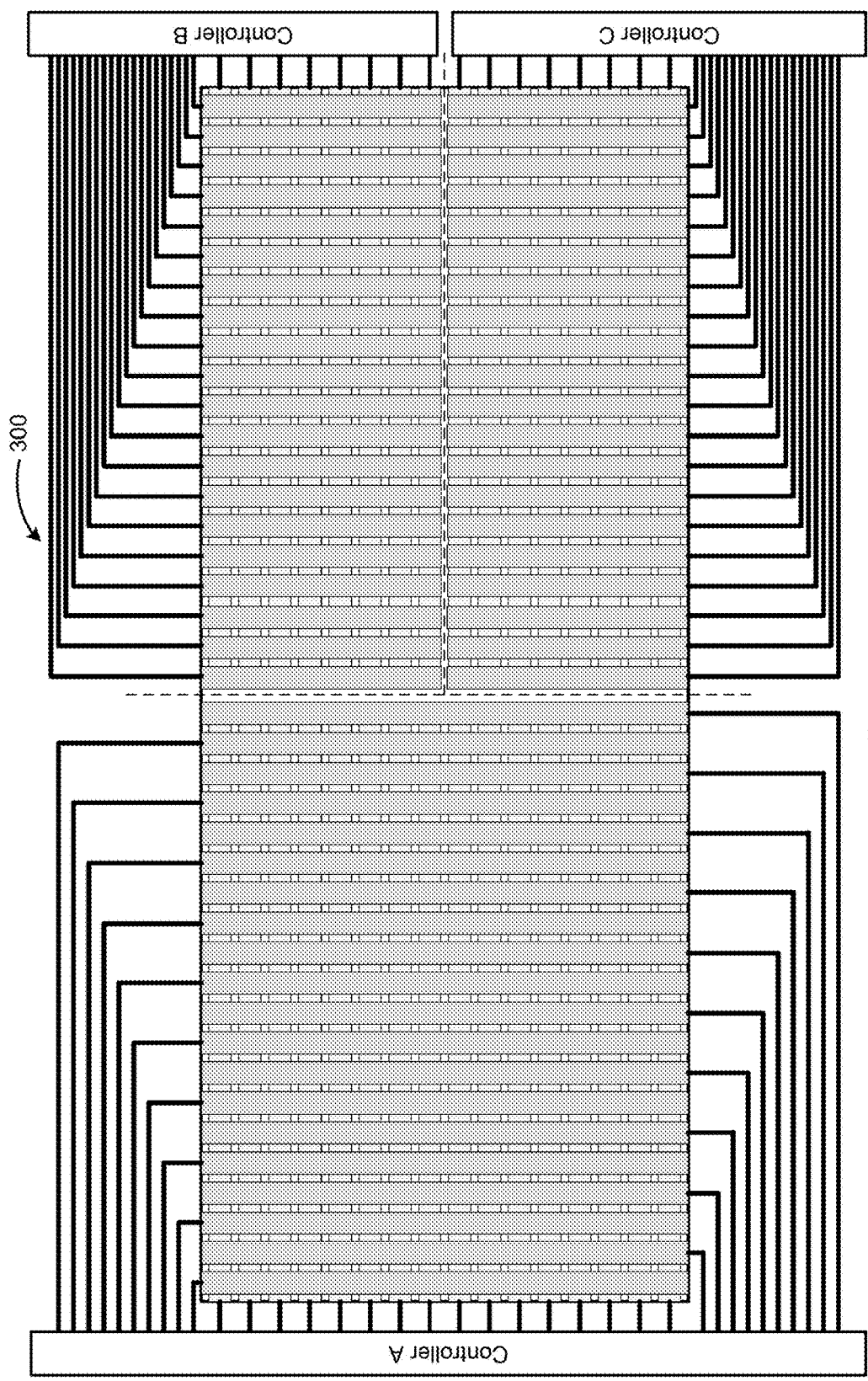
FIG. 3 is a block diagram of another exemplary touch sensor according to an exemplary embodiment of the inventive concepts disclosed herein.
Figure 4:
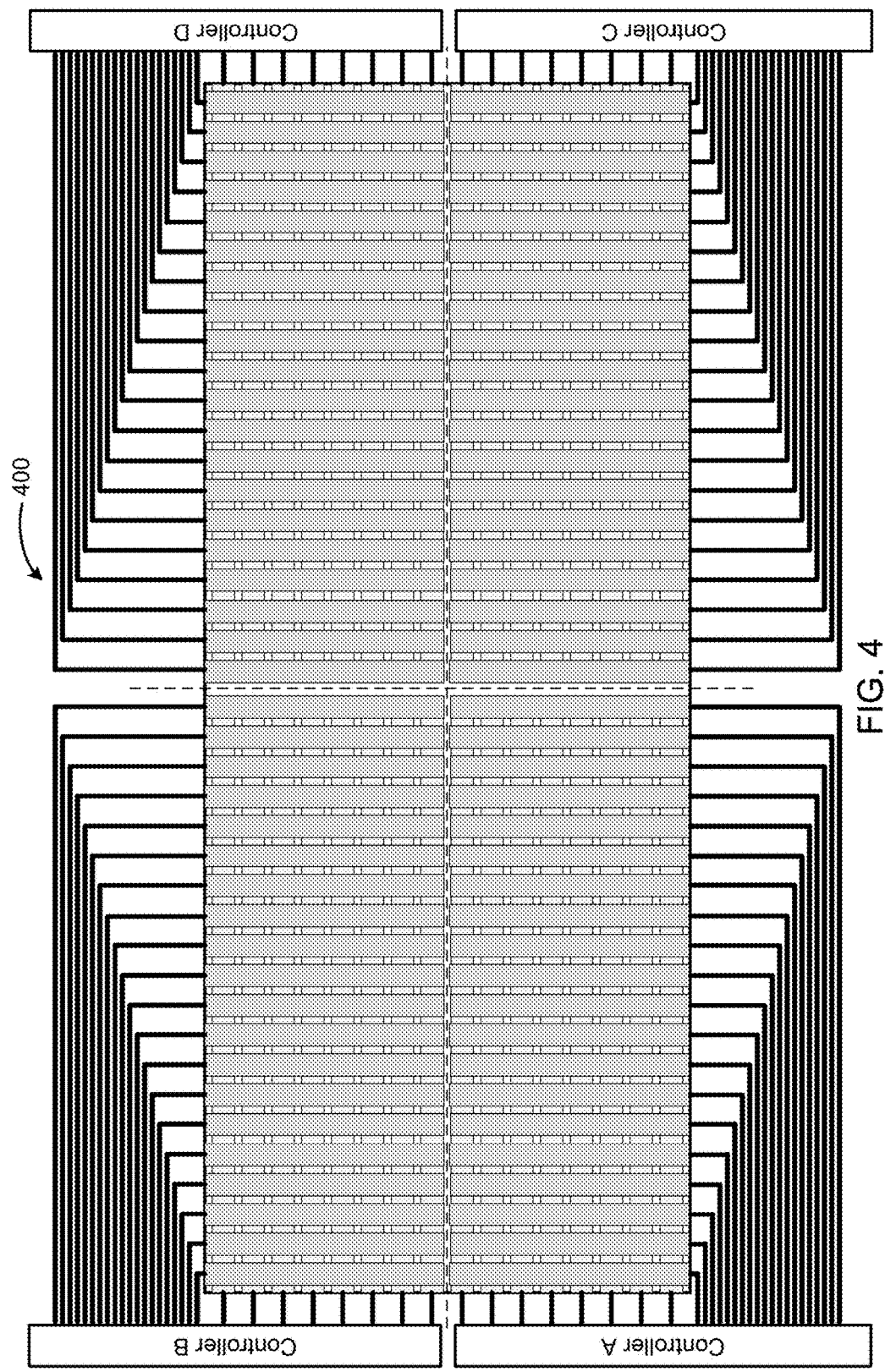
FIG. 4 is a block diagram of another exemplary touch sensor according to an exemplary embodiment of the inventive concepts disclosed herein.

Referring now to FIGS. 3 and 4, block diagrams of additional exemplary touch sensors 300 and 400 configured in accordance with embodiments of the inventive concepts disclosed herein are shown. It is noted that the touch sensors 300 and 400 are similar to the touch sensor 100 previously described, but with more than two electrically isolated touch regions defined. It is noted that touch sensors 300 and 400 configured as such may be utilized to provide triple and quadruple redundancies, respectively, which may be appreciated in certain applications.

Figure 5:
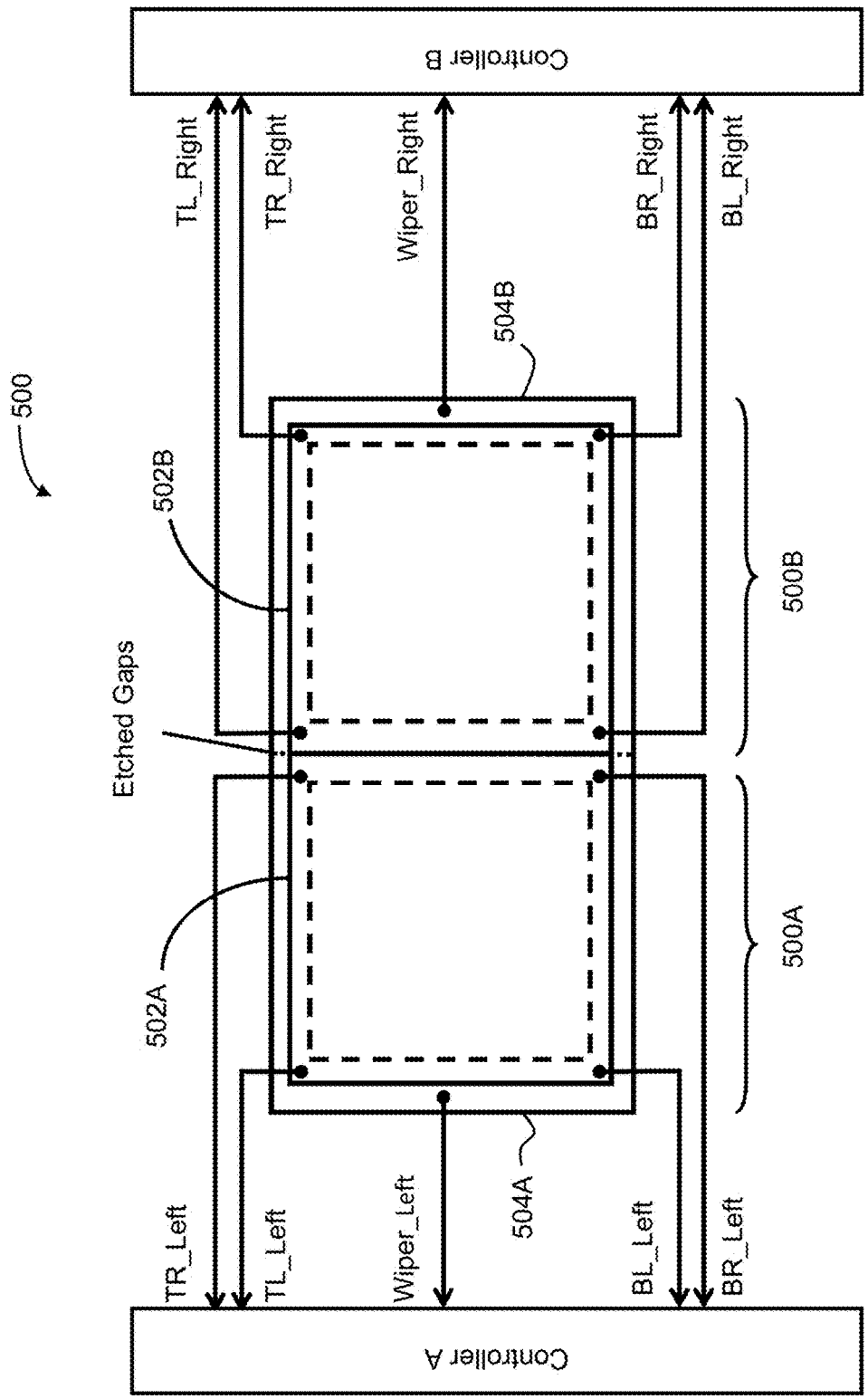
FIG. 5 is a block diagram of an exemplary touch sensor according to an exemplary embodiment of the inventive concepts disclosed herein.

Referring now to FIG. 5, a block diagram of an exemplary touch sensor 500 configured in accordance with an embodiment of the inventive concepts disclosed herein is shown. It is noted that the touch sensor 500 is similar to the touch sensor 100 in that the touch sensor 500 also includes two physically connected and electrically isolated touch regions 500A and 500B. It is noted, however, that the touch regions 500A and 500B do not define digital resistive matrices. Instead, the touch regions 500A and 500B may implement 5-wire resistive technologies to help reduce the number of sensor tracks and track interconnects needed in the touch sensor 500.

As shown in FIG. 5, the touch sensor 500 may include a bottom layer 502 and a top layer 504. The bottom layer 502 may be electrically isolated into two portions 502A and 502B by gap(s) etched into the bottom layer 502. Similarly, the top layer 504 may be electrically isolated into two portions 504A and 504B by gap(s) etched into the top layer 504. For illustrative purposes, suppose the etched gaps electrically divide the bottom layer 502 and the top layer 504 into left and right portions, the left portion of the bottom layer 502A and the left portion of the top layer 504A may effectively form a first 5-wire touch region 500A, which can be electrically isolated from a second 5-wire touch region 5008 formed by the right portion of the bottom layer 502B and the right portion of the top layer 504B.

It is noted that the two touch regions 500A and 500B may each operate independently as a normal 5-wire touch sensor. For instance, the bottom layer 502A/502B of each touch region 500A/500B may be configured to provide equipotential distribution in both X and Y directions using the four corner wires labeled TL, TR, BL, and BR. The top layer 504A/504B of each touch region 500A/500B may be configured to measure a voltage upon receiving a touch input using a fifth (wiper) wire. The voltage measured using the wiper wire may be provided to a corresponding controller, which may determine the location of the touch input based on the measured voltage. With both touch regions 500A and 500B operating independently, if one of the touch regions 500A/500B fails, the other touch region may still remain operational.

As will be appreciated from the above, touch sensors configured in accordance with embodiments of the inventive concepts disclosed herein are capable of not only provide full support for touch functions during normal operations, but also provide true redundancies when needed. It is contemplated that the touch sensors configured in accordance with embodiments of the inventive concepts disclosed herein may be implemented as standalone touch sensing devices, or as components of devices such as electronic displays or the like. In some embodiments, the touch sensors configured in accordance with embodiments of the inventive concepts disclosed herein may be utilized as components of safety critical systems such as flight displays or the like. It is contemplated that the touch sensors configured in accordance with embodiments of the inventive concepts disclosed herein may be utilized in various other types of applications without departing from the broad scope of the inventive concepts disclosed herein.

Figure 6:
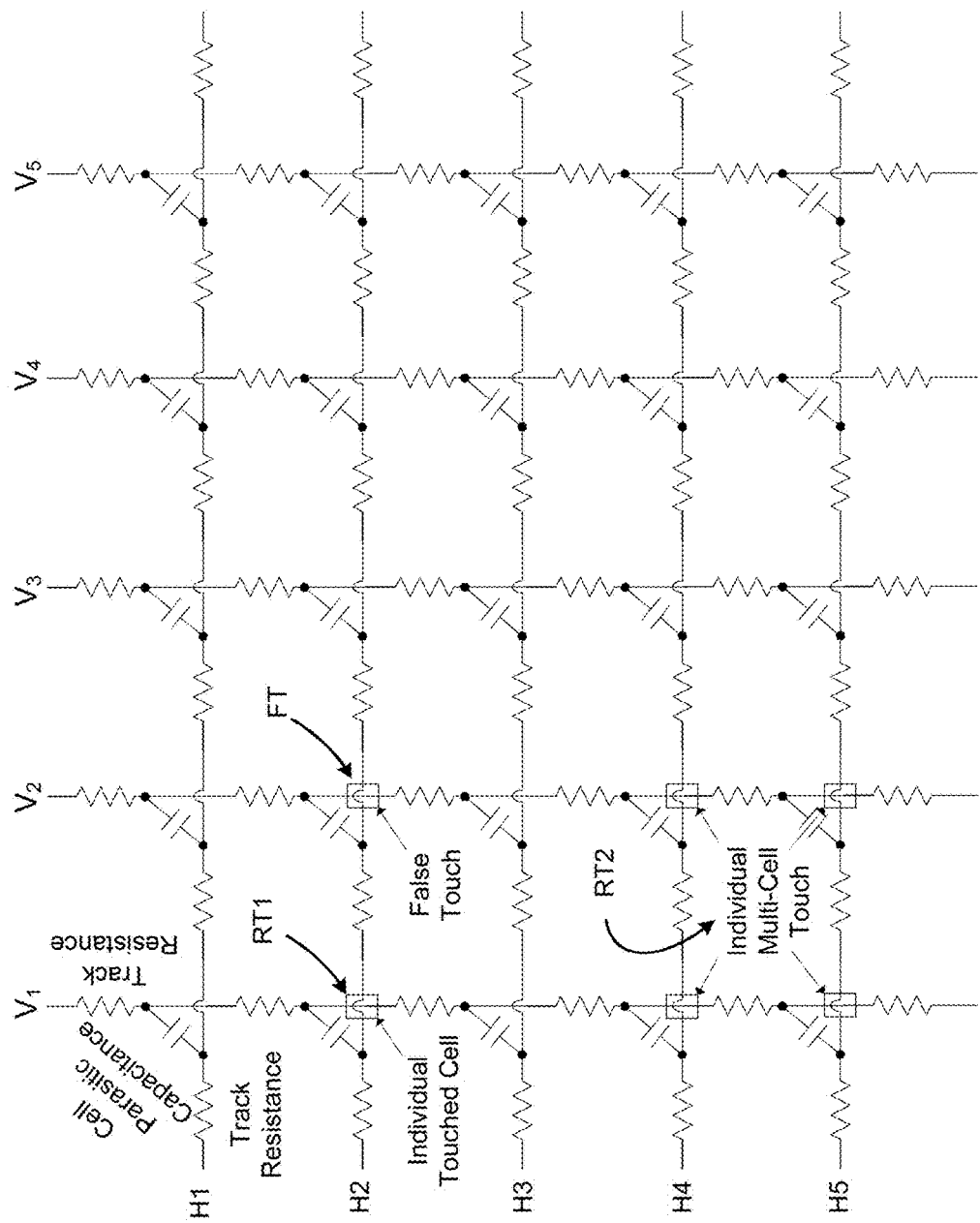
FIG. 6 is an illustration depicting an occurrence of a false touch.

It is also contemplated that touch sensors configured in accordance with embodiments of the inventive concepts disclosed herein may be equipped with additional mechanisms configured to effectively detect possible false touches. FIG. 6 is a simplified illustration depicting the occurrence of a false touch. More specifically, FIG. 6 shows a partial digital resistive matrix having vertical sensor tracks labeled V1 through V5 and horizontal sensor tracks labeled H1 through H5. Suppose, for illustrative purposes, real touch inputs are received at locations RT1 and RT2, these two real touch inputs may interact with each other and form a pattern that may cause the digital resistive matrix to (falsely) recognize location FT as being electrically connected.

Figure 7:
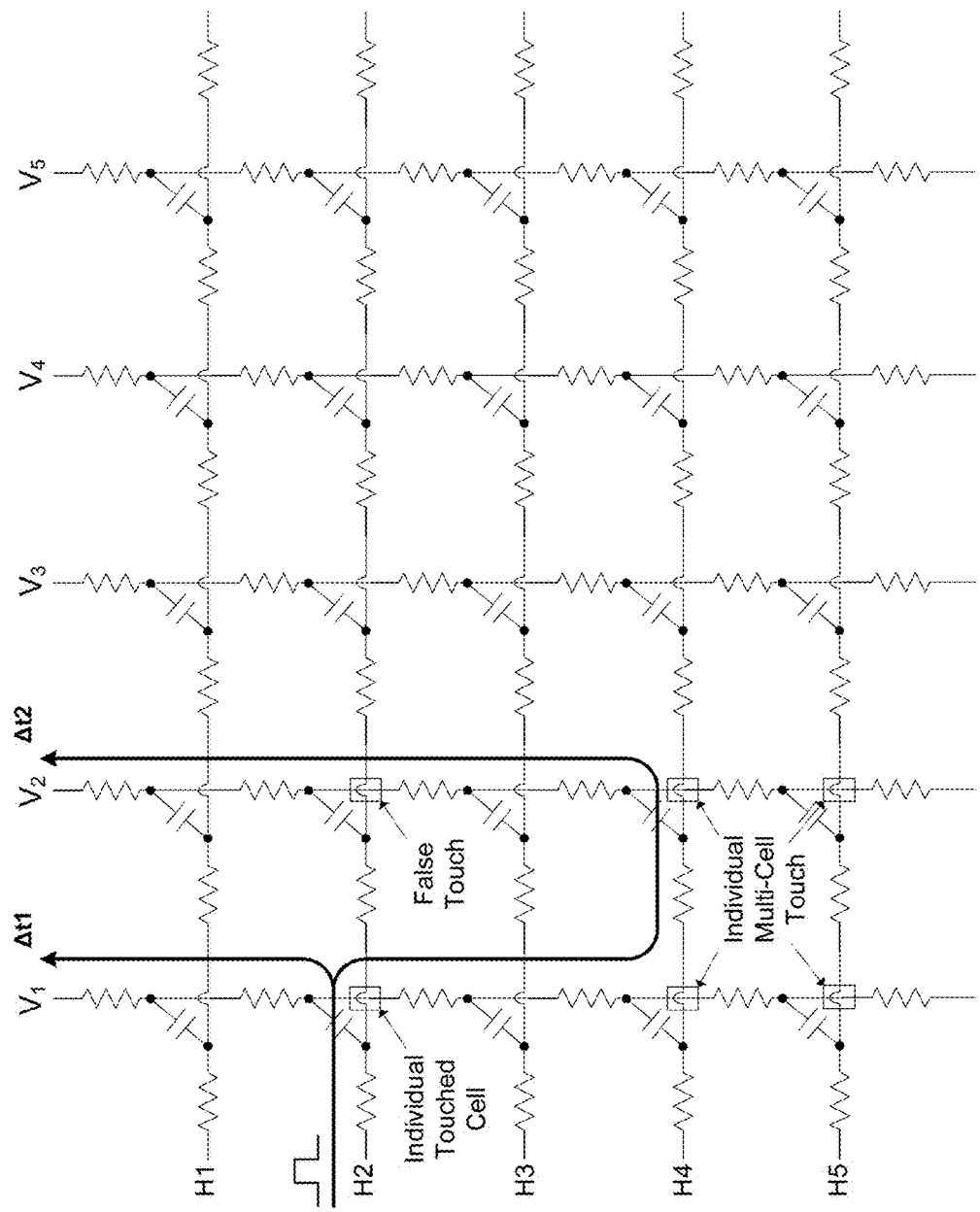
FIG. 7 is an illustration depicting a mechanism configured to detect false touches according to an exemplary embodiment of the inventive concepts disclosed herein.

FIG. 7 is a simplified illustration depicting a time-of-flight based mechanism configured to effectively detect false touches. As shown in FIG. 7, signal transmission times (may also be referred to as signal flight times) through the digital resistive matrix may be measured (e.g., by a corresponding controller of the digital resistive matrix) while checking for electrical continuity. For illustrative purposes, suppose it took track V1 ΔT1 amount of time to receive a signal from track H2 while it took track V2 ΔT2 amount of time to receive the same signal. If ΔT2 is larger than ΔT1, it may be reasonable to conclude that the signal took a longer route instead of flowing through the connection between H2 and V2, which may serve as a good indication that the perceived electrical connection between H2 and V2 may be false. Alternatively and/or additionally, a calibration process may be performed without any touch inputs to determine a nominal signal transmission time through each horizontal and vertical track. Nominal signal transmission times may then be compared against measured signal transmission times to help determine the location of a perceived connection and whether the perceived connection is true or false.

It is to be understood that while a time-of-flight based false touch detection mechanism is referenced in the examples above, such a false touch detection mechanism is merely exemplary and is not meant to be limiting. It is contemplated that whether to implement a false touch detection mechanism may depend on various factors. It is also contemplated that specific implementations of touch detection mechanisms may vary without departing from the broad scope of the inventive concepts disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. An apparatus, comprising:
a touch sensor electrically partitioned into at least a first touch region and a second touch region, the first touch region and the second touch region being physically connected and electrically isolated from each other, the touch sensor formed within an electronic display, the touch sensor including a first side, second side, third side and fourth side whereby each side is within the electronic display, the first touch region and the second touch region each independently defines an independently operable portion of the touch sensor such that a failure in one of the first touch region or the second touch region does not impair operations in another one of the first touch region or the second touch region, the independently operable portion is connected to a corresponding controller, wherein each conductive sensor track in the independently operable portion is connected to the corresponding controller utilizing track interconnect, wherein at least one side of the first side, second side, third side and fourth side of the touch sensor is free of track interconnects.

2. The apparatus of claim 1, wherein the touch sensor comprises a digital resistive matrix, and wherein the first touch region and the second touch region each independently defines an independently operable portion of the digital resistive matrix.

3. The apparatus of claim 2, wherein the independently operable portion of the digital resistive matrix is defined by a plurality of conductive sensor tracks positioned in a first direction and a plurality of conductive sensor tracks positioned in a second direction.

4. The apparatus of claim 1, wherein the corresponding:
controller in communication with a particular one of the first touch region or the second touch region is configured to provide false touch detection for the particular one of the first touch region or the second touch region at least partially based on measured signal transmission times of a signal sent through the particular one of the first touch region or the second touch region.

5. An apparatus, comprising:
a touch sensor electrically partitioned into at least a first touch region and a second touch region, the first touch region and the second touch region being physically connected and electrically isolated from each other, the touch sensor formed within an electronic display, the touch sensor including a first side, second side, third side and fourth side whereby each side is within the electronic display, the first touch region and the second touch region each independently defines an independently operable digital resistive matrix such that a failure in one of the first touch region or the second touch region does not impair operations in another one of the first touch region or the second touch region, the independently operable portion is connected to a corresponding controller, wherein each conductive sensor track in the independently operable portion is connected to the corresponding controller utilizing track interconnect, wherein at least one side of the first side, second side, third side and fourth side of the touch sensor is free of track interconnects.

6. The apparatus of claim 5, wherein the independently operable digital resistive matrix is defined by a plurality of conductive sensor tracks positioned in a first direction and a plurality of conductive sensor tracks positioned in a second direction.

7. The apparatus of claim 5, wherein the corresponding:
controller in communication with a particular one of the first touch region or the second touch region, the controller configured to provide false touch detection for the particular one of the first touch region or the second touch region at least partially based on measured signal transmission times of a signal sent through the particular one of the first touch region or the second touch region.

8. An apparatus, comprising:
a touch sensor electrically partitioned into at least a first touch region, a second touch region, and at least one additional touch region, the touch sensor being formed within an electronic display, the first touch region, the second touch region, and the at least one additional touch region being physically connected and electrically isolated from each other, the first touch region, the second touch region, and the at least one additional touch region each independently defines an independently operable portion of the touch sensor such that a failure in one of the first touch region, the second touch region, or the at least one additional touch region does not impair operations in another one of the first touch region, the second touch region, or the at least one additional touch region.

9. The apparatus of claim 8, wherein the touch sensor comprises a digital resistive matrix, and wherein the first touch region, the second touch region, and the at least one additional touch sensor each independently defines an independently operable portion of the digital resistive matrix.

10. The apparatus of claim 8, wherein the independently operable portion of the digital resistive matrix is defined by a plurality of conductive sensor tracks positioned in a first direction and a plurality of conductive sensor tracks positioned in a second direction.

* * * * *